(12) United States Patent
Bell et al.

(10) Patent No.: US 7,909,389 B2
(45) Date of Patent: Mar. 22, 2011

(54) PROTECTION DEVICE FOR A PIVOTABLE CAB STRUCTURE

(75) Inventors: Christopher Dixon Bell, Davenport, IA (US); Kyle Brenner, Silvis, IL (US); Loras Lavern Weinschenk, Camanche, IA (US); Michael David Case, Kechi, KS (US)

(73) Assignee: CNH America LLC, New Holland, PA (US)

( * ) Notice: Subject to any disclaimer, the term of this patent is extended or adjusted under 35 U.S.C. 154(b) by 307 days.

(21) Appl. No.: 12/023,346

(22) Filed: Jan. 31, 2008

(65) Prior Publication Data

US 2009/0195022 A1    Aug. 6, 2009

(51) Int. Cl.
*B62D 33/067* (2006.01)
(52) U.S. Cl. ............ 296/190.08; 296/190.06; 180/89.14
(58) Field of Classification Search ............. 296/190.03, 296/190.06, 190.05, 190.08, 190.01, 190.04, 296/208, 203.01, 187.01; 180/89.14, 89.15, 180/89.12, 89.13, 89.17
See application file for complete search history.

(56) References Cited

U.S. PATENT DOCUMENTS

| | | | |
|---|---|---|---|
| 3,509,701 A * | 5/1970 | Clarke ............................ | 56/208 |
| 3,935,920 A | 2/1976 | Schiel | |
| 3,995,761 A | 12/1976 | Hurlburt | |
| 4,260,320 A * | 4/1981 | Steiger .......................... | 414/680 |
| 4,304,142 A | 12/1981 | Blomstrom | |
| 4,392,669 A | 7/1983 | Martin, Jr. | |
| 4,880,269 A | 11/1989 | Jensen et al. | |
| 5,002,332 A * | 3/1991 | Ikeda ....................... | 296/190.11 |
| 5,551,826 A * | 9/1996 | Todd et al. .................... | 414/685 |
| 6,357,820 B1 * | 3/2002 | Nagatsuka et al. ...... | 296/190.06 |
| 6,543,563 B1 * | 4/2003 | Muraro ....................... | 180/89.12 |
| 6,688,658 B2 | 2/2004 | Mori et al. | |
| 6,823,632 B2 | 11/2004 | Yun | |
| 6,910,731 B2 * | 6/2005 | Albright et al. .......... | 296/190.05 |
| 2006/0000123 A1 * | 1/2006 | Chikaishi et al. ............... | 37/379 |
| 2006/0245895 A1 * | 11/2006 | Horst et al. .................... | 414/680 |

FOREIGN PATENT DOCUMENTS

| JP | 2005162034 A | 6/2005 |
|---|---|---|
| KR | 100376001 B1 | 3/2003 |
| KR | 10383982 A | 5/2003 |

* cited by examiner

*Primary Examiner* — Glenn Dayoan
*Assistant Examiner* — SunSurraye Westbrook
(74) *Attorney, Agent, or Firm* — Michael G. Harms; Patrick M. Sheldrake

(57) ABSTRACT

A work vehicle includes a frame, a cab structure pivotably connected to the frame and an implement connected to the frame. A body is disposed between the cab structure and the implement to sufficiently limit pivotal movement of the cab structure with respect to the implement to prevent damage to the cab structure by the implement.

19 Claims, 7 Drawing Sheets

US 7,909,389 B2

PROTECTION DEVICE FOR A PIVOTABLE CAB STRUCTURE

FIELD OF THE INVENTION

The present invention relates generally to work vehicles. It relates more particularly to protection of a cab structure that is pivotable with respect to a frame of a work vehicle.

BACKGROUND OF THE INVENTION

Work vehicles, such as skid steer loaders, have longitudinally spaced pairs of wheels rotatably carried by a frame or chassis of the loader to permit a driving rotation thereof. Each of the wheels is driven, usually by hydraulic motors powered from an engine supported by the frame of the loader. Steering of the skid steer loader is accomplished by powering the rotation of the wheels on opposing sides of the frame of the loader at differential speeds.

Typically, the hydraulic motors and associated linkages are located beneath the seat of the skid steer loader. To facilitate servicing the apparatus beneath the seat, and for other reasons, a cab structure for protecting an operator is configured to pivot with respect to the frame. However, pivoting the cab structure may inadvertently cause damage to the cab structure by other components of the work vehicle.

Accordingly, it would be advantageous to prevent damage to the cab structure associated with pivoting of the cab structure.

SUMMARY OF THE INVENTION

The present invention relates to a work vehicle including a frame, a cab structure pivotably connected to the frame and an implement connected to the frame. A body is disposed between the cab structure and the implement to sufficiently limit pivotal movement of the cab structure with respect to the implement to prevent contact between the cab structure and the implement.

The present invention further relates to a device including a body configured to be disposed between a cab structure and an implement of a work vehicle. The cab structure is pivotably connected to a frame of the work vehicle, and the implement is pivotably connected to the frame. The body sufficiently limits pivotal movement of the cab structure with respect to the implement to prevent contact between the cab structure and the implement.

The present invention further relates to a method for limiting rotational movement. The method includes disposing a body between a cab structure and an implement of a work vehicle, the cab structure pivotably connected to a frame of the work vehicle, and the implement pivotably connected to the frame. The body sufficiently limits pivotal movement of the cab structure with respect to the implement to prevent contact between the cab structure and the implement.

An advantage of the present invention is prevention of damage to a cab structure that is pivotable with respect to a frame and/or an implement of a work vehicle due to inadvertent pivoting of the cab structure by the frame and/or implement.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
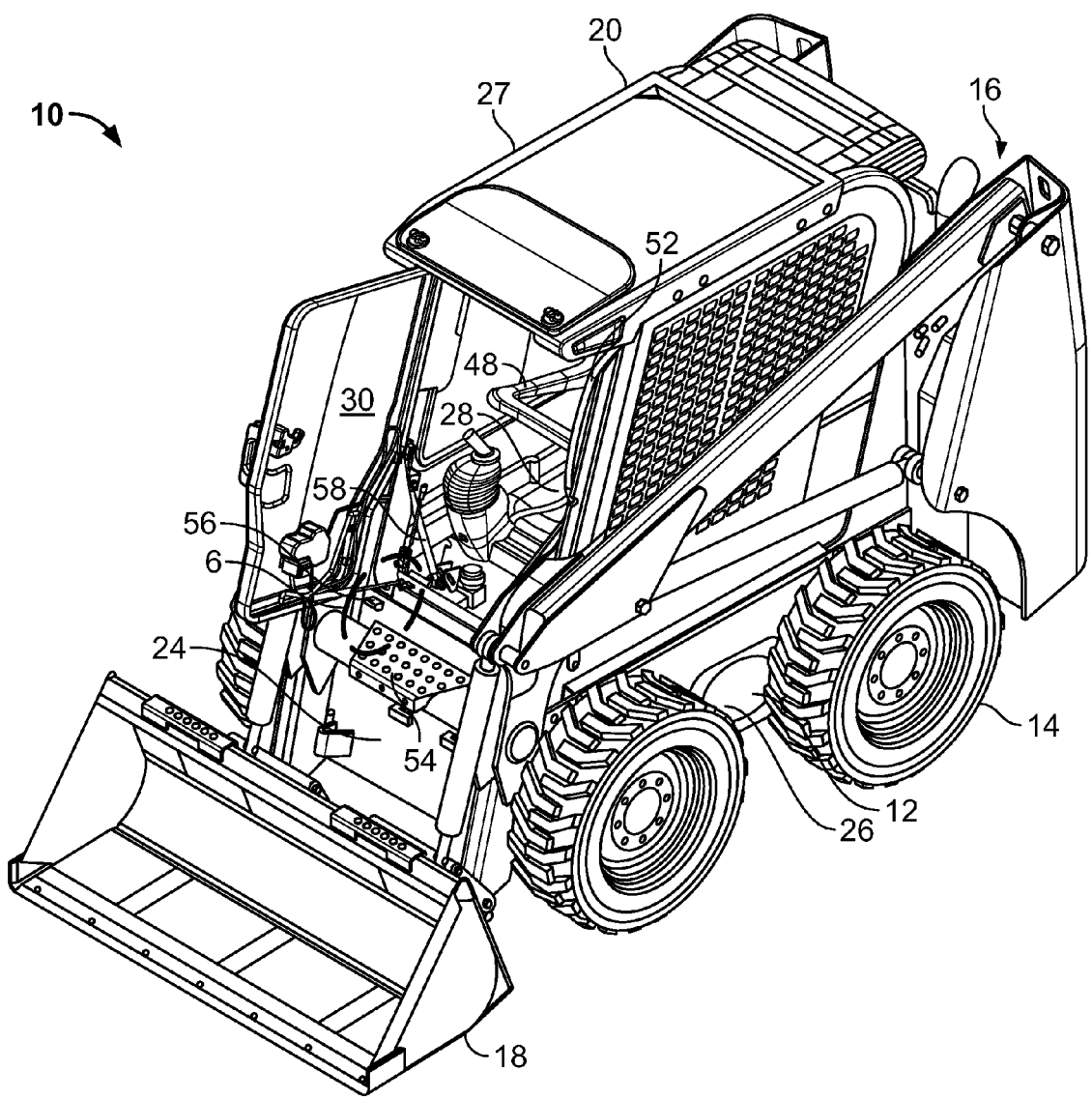
FIG. 1 is a top perspective front view of an embodiment of a work vehicle of the present invention.

FIG. 1 shows an exemplary work vehicle 10 including a frame 12 that rotatably carries a plurality of wheels 14. An implement 18 including a structure 16 having an arrangement of structural members and actuators controllable by an operator (not shown) to manipulate implement 18 to perform work is also connected to frame 12. Implement 18 includes, but is not limited to, brooms, augers, rakes, bales spikes, buckets, blades, hammers, forks, hoes, rock wheels, stump grinders and tillers. In an alternate embodiment, structure 16 may maintain implement 18 in a fixed or non-moving relationship with frame 12. Frame 12 structurally supports a cab structure 20 to surround and protect the operator. The cab structure 20 is capable of pivoting with respect to frame 12. Frame 12 includes a front end 24 disposed proximate to implement 18. Front end 24 is disposed between opposed sides 26, 27. A seat 28 is disposed interior of cab structure 20 which is accessible via a door 30. Door 30 is pivotably connected to cab structure 20, although in alternate embodiments, the door 30 may be slidably connected or in some other connective relationship with the cab structure 20. In further alternative embodiments, the door 30 may be deleted. As will be discussed in further detail below, a protection device 56 disposed between cab structure 20 and structure 16 sufficiently limits pivotal movement of cab structure 20 with respect to implement 18 to prevent damage to the cab structure 20 by the implement 18.

Figure 2:
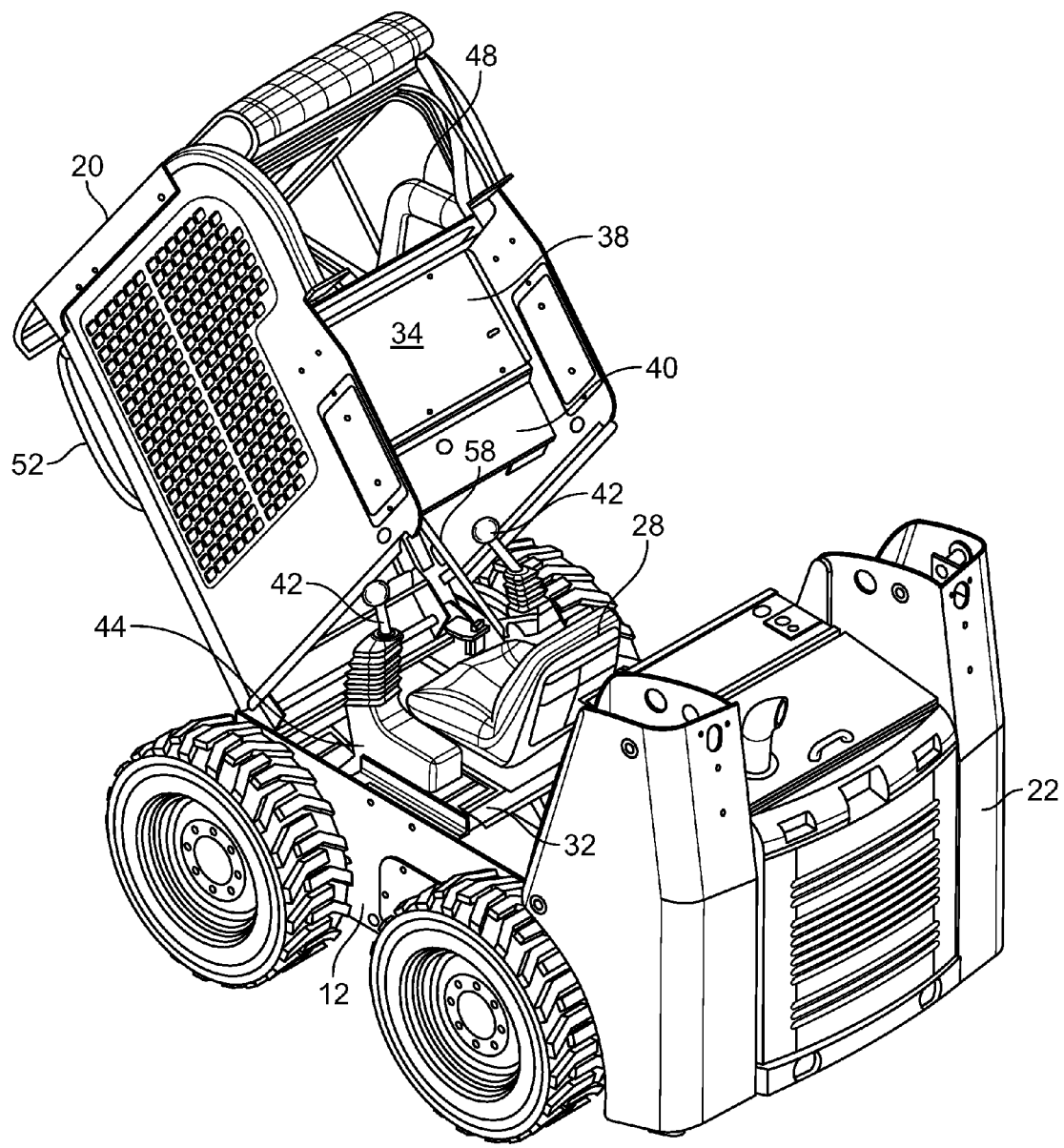
FIG. 2 is a top perspective rear view of an embodiment of a work vehicle, lifting structure removed, of the present invention.

FIG. 2 shows a top perspective rear view of the exemplary work vehicle 10 of FIG. 1 with cab structure 20 rotated away from frame 12 and structure 16 removed for clarity. As shown in FIG. 2, seat 28 is disposed between a pair of operator controls 42 that each includes a respective housing 44. As further shown, seat 28 includes a base 32 that is secured to the seat. In an alternate embodiment, base 32 and seat 28 are of unitary construction.

Figure 3:
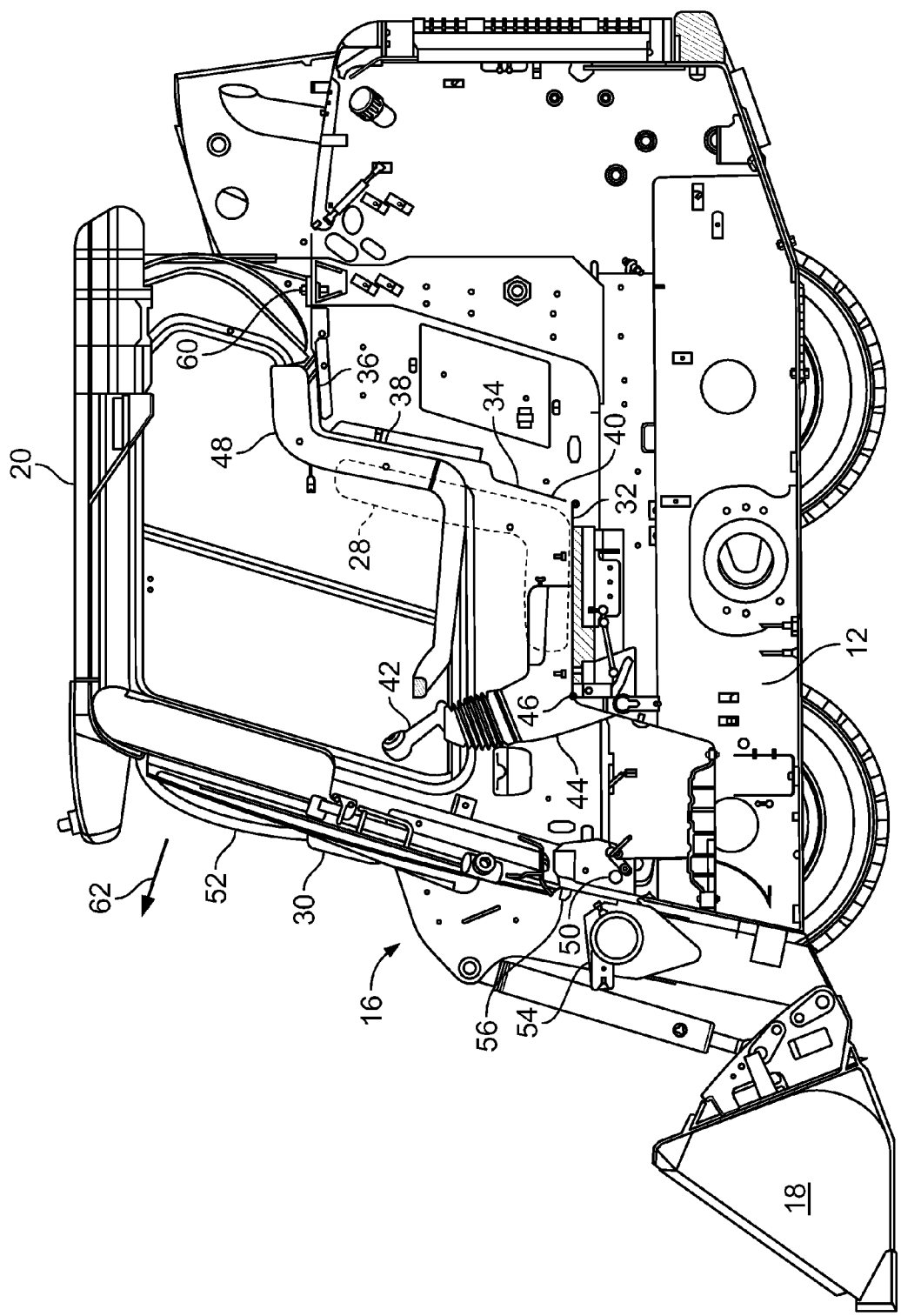
FIG. 3 is a top elevation view of a cutaway of an embodiment of a work vehicle of the present invention.

FIG. 3 shows a partial cutaway view of work vehicle 10 provided for clarity. As shown in FIG. 3, a pivoting connection 46 is disposed between base 32 and frame 12. Pivoting connection 46 may be a hinge, a piano hinge, or other pivoting arrangement as would be appreciated by one of ordinary skill in the art.

As shown in FIG. 3, cab structure 20 includes a panel 34 that is disposed behind seat 28 when cab structure 20 abuts frame 12. Panel 34 includes an upper portion 36 extending to a middle portion 38 that further extends to a lower portion 40 that is adjacent to base 32 supporting seat 28. In alternate embodiments, panel 34 may be modified or otherwise deleted. When cab structure 20 is rotated about pivoting connection 50, panel 34 is raised above seat 28. An operator restraining device 48 is pivotably secured to upper portion 36.

To effect cab structure 20 pivot or rotation, fasteners 60 securing upper portion 36 to frame 12 are loosened. An operator (not shown) may then place his feet on a step 54 disposed on structure 16 and grasp hand rail 52 disposed along a vertical corner of cab structure 20 and apply an opening force 62. A strut 58 (FIGS. 1 and 2) extends, contributing an opening force along its length to help move cab structure 20 from a closed or operating position (FIG. 1) to an open position (FIG. 2). In one embodiment, the open position represents a rotation of cab structure 20 between about 55 to about 60 degrees with respect to the frame 12 (FIG. 2) as compared to the closed position (FIGS. 1 and 3).

In the exemplary embodiment, as further shown in FIG. 3, door 30 would be damaged by structure 16 if cab structure 20 were permitted to unlimitedly or uncontrollably pivot about pivoting connection 50, i.e., proximate to step 54. However, when installed, protection device 56 sufficiently limits pivotal movement of the cab structure 20 with respect to implement 18 to prevent damage to the cab structure 20 by the implement 18 by preventing contact between cab structure 20 and implement 18. In alternate embodiments, damage to the cab structure 20 may alternatively or additionally be inflicted by contact with frame 12 due to unlimited pivoting of the cab structure 20 with respect to frame 12 and/or structure 16. In the exemplary embodiment, a pair of protection devices 56 is utilized (only one shown in FIG. 3), although in alternate embodiments, one or more than two protective devices 56 may be utilized as needed to protect the cab structure 20.

Figure 4:
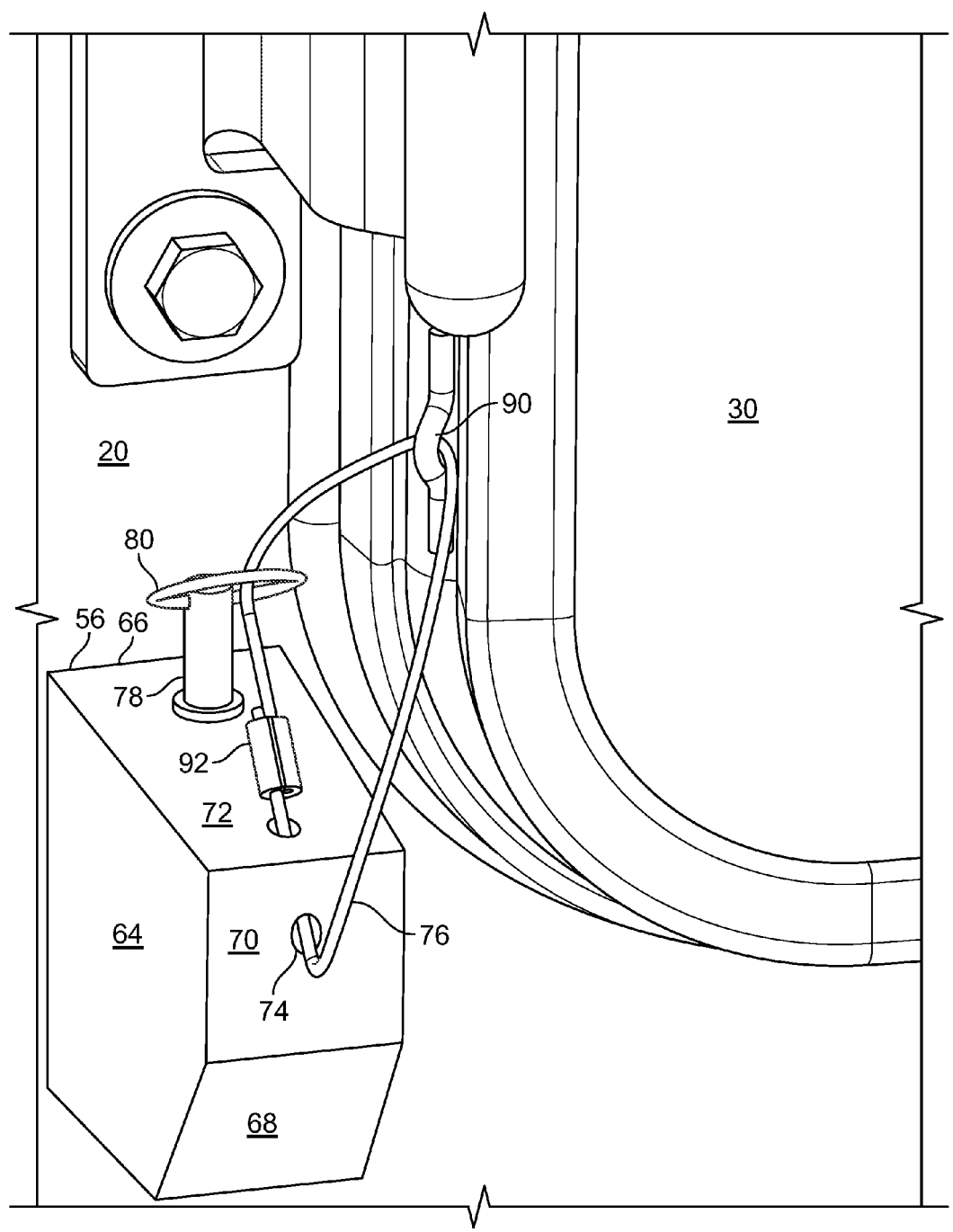
FIG. 4 is an enlarged partial front perspective front view of an embodiment of a work vehicle taken along region 6 of FIG. 1, with the door closed, of the present invention.
Figure 5:
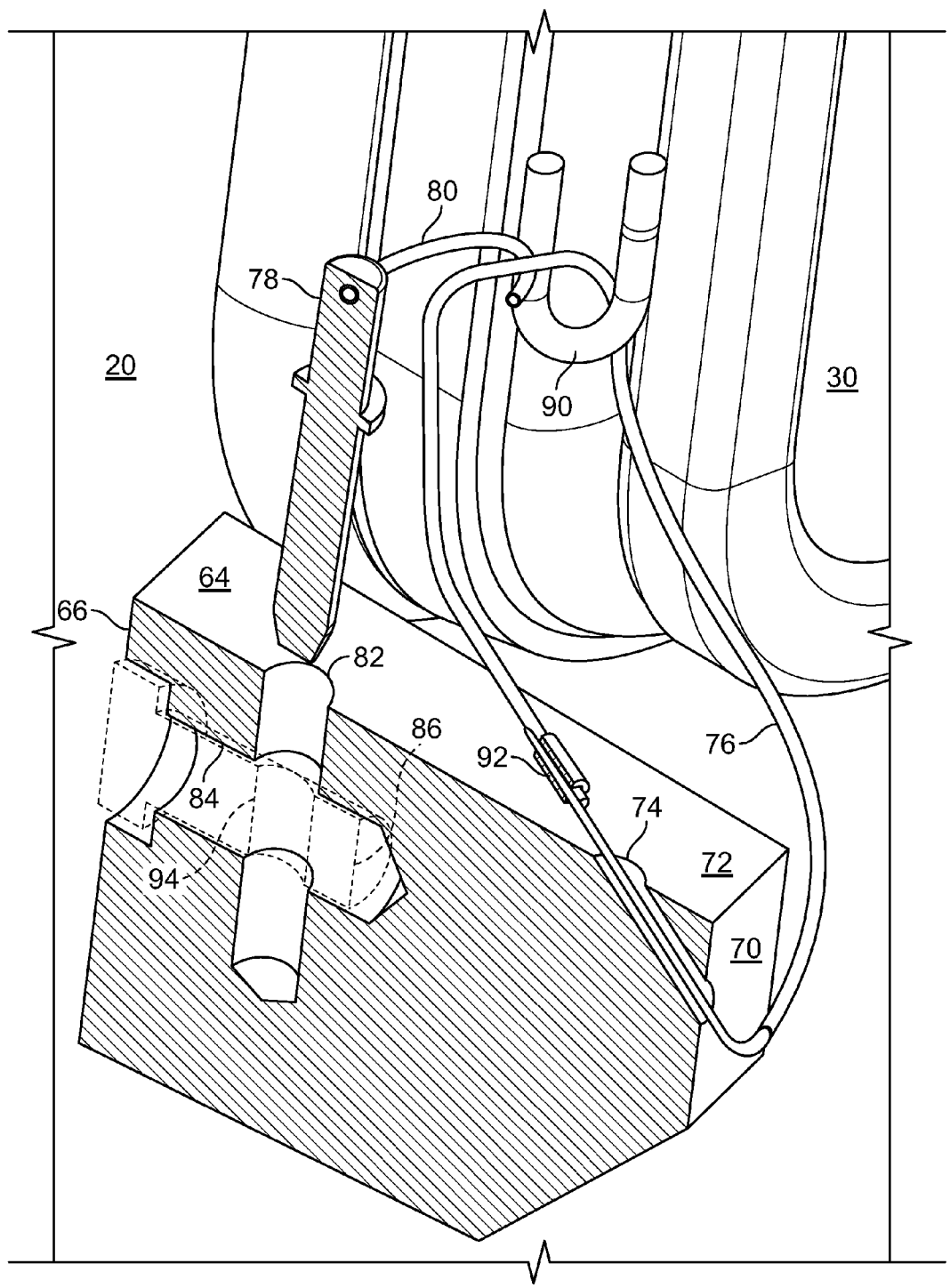
FIG. 5 is an enlarged partial front perspective front view of an embodiment of a work vehicle taken along region 6 of FIG. 1, with the door closed, including a cross-section of a protection device, of the present invention.
Figure 6:
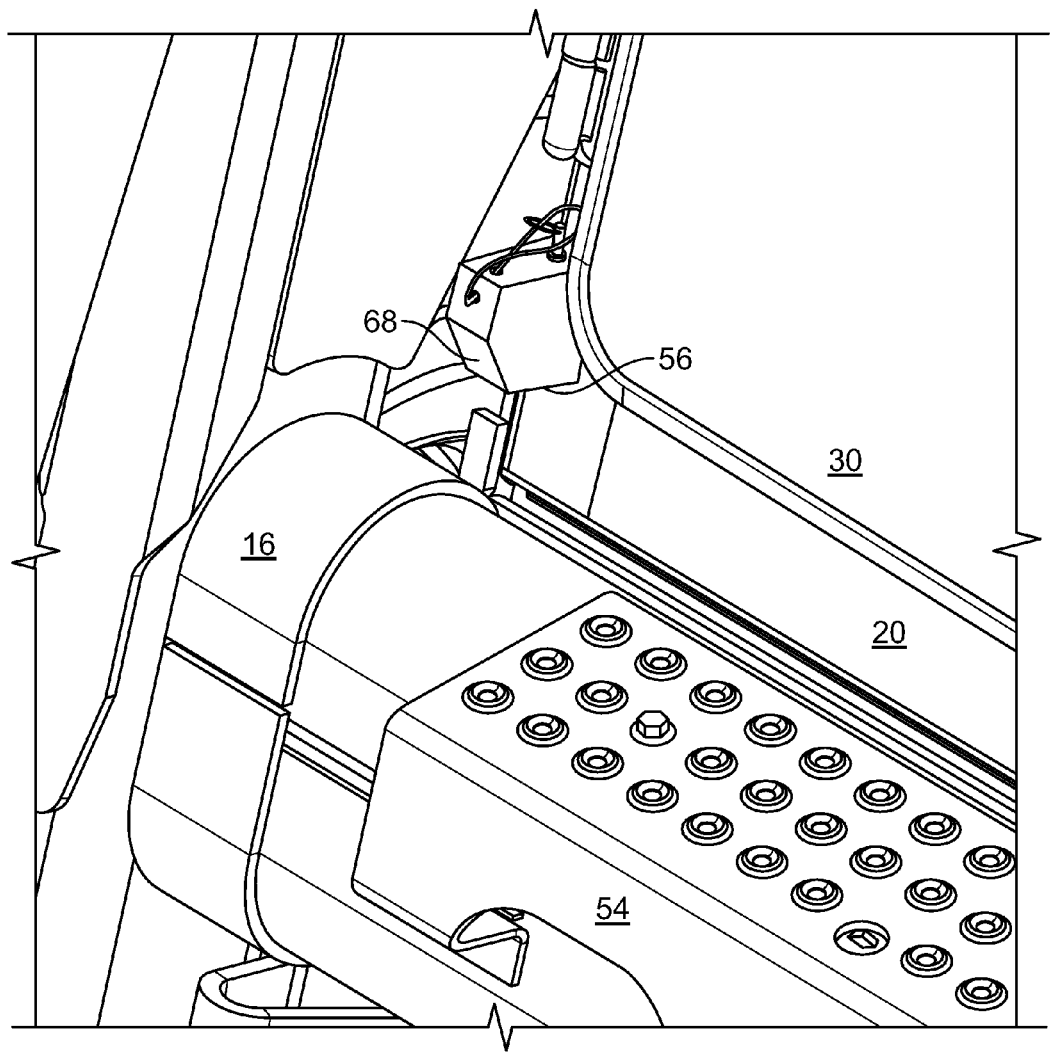
FIG. 6 is an enlarged partial front perspective rear view of an embodiment of a work vehicle taken along region 6 of FIG. 1, of the present invention.

As shown in FIGS. 4 and 5, protection device 56 includes a body 64 having a surface 66 abutting or in close proximity to cab structure 20 when protection device 56 is installed. Body 64 further includes surface 68 that abuts structure 16 (FIG. 7) when cab structure 20 is urged by pivoting movement 88 (FIG. 7) as previously discussed. A lanyard 76 forming a closed loop with a crimped fitting 92 connects protection device 56 to door 30. An aperture 74 formed in body 64 through surfaces 70 and 72 of body 64 receives lanyard 76, and an eyelet 90 of door 30 also receives lanyard 76. In one embodiment, eyelet 90 may be an aperture formed in the structure of door 30 so that the door structure is of unitary construction. In an alternate embodiment, fitting 92 may be configured to be disassembled, permitting lanyard 76 to be removably connected to cab structure 20 and protection device 56. FIG. 6 shows protection device 56 installed with cab structure 20 disposed in an operating or closed position with respect to frame 12 (FIG. 1).

Figure 7:
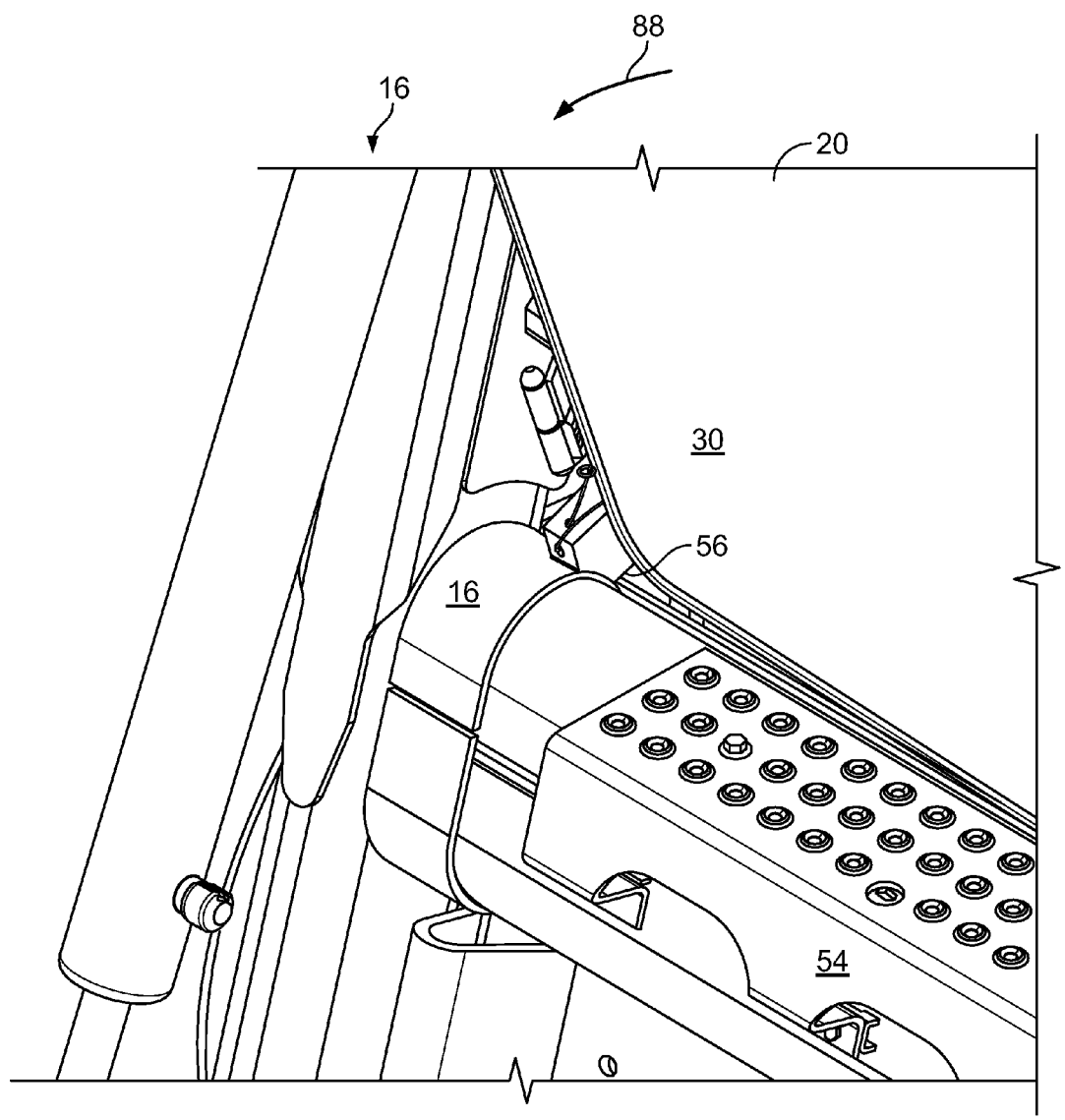
FIG. 7 is an enlarged partial front perspective rear view of an embodiment of a work vehicle taken along region 6 of FIG. 1, with the cab structure pivoting limited by an embodiment of a protection device, of the present invention.

Referring to FIGS. 4 and 5, body 64 is formed of a rigid or substantially rigid material having sufficient structural strength and stiffness to limit pivoting movement of cab structure 20 due to pivoting movement 88 of cab structure (FIG. 7). For example, body 64 may be formed of materials such as metal, hard rubber, plastic, composites, wood, as well as other suitable materials. In one embodiment, body 64 is composed of a non-marring material, or coated with a non-marring material.

FIG. 5 further shows body 64 and fastener 78 in cross-section with fastener 78 aligned for insertion into body 64. Body 64 includes an aperture 82 formed through surface 72 that intersects a shouldered bore 84 formed through surface 66. Bore 84 is sized to receive a protrusion 86, such as a bayonet pin extending outwardly from cab structure 20. When protrusion 86 is sufficiently inserted inside bore 84, protrusion 86 includes an aperture 94 that aligns with aperture 82 for receiving a fastener 78 that is inserted inside aperture 82. Fastener 78 includes a ring 80 which receives lanyard 76. Fastener 78 may include retention features, such a "ball-lock" feature known in the art, permitting removal of fastener 78 from body 64. In such a manner, body 64 may be removably connected to cab structure 20, and body 64 may even be manually removable from cab structure 20. For purposes herein, manually removable is intended to mean that a person of average strength and dexterity is capable of removing an article of interest without tools. In the exemplary embodiment, when fastener 78 is removed from aperture 82, and when door 30 is removed from cab structure 20, protection device 56 may also be removed from cab structure 20. In alternate embodiments, protection device 56 may be connected to cab structure 20, implement 18 and/or both cab structure 20 and implement 18.

It is to be understood that the protection device 56 of the present invention may be configured to prevent damage due to rotation of cab structure 20 from more than one position, i.e., other than the closed or operating position of the cab structure 20 with respect to the frame 12. For example, in an alternate embodiment, when cab structure 20 is in the fully opened position (FIG. 2) and a different implement 18 is installed, contact between the cab structure 20 and implement 18 could occur when the cab structure 20 is returned toward its closed position (FIG. 1) or another position between the open and closed positions. In alternate embodiments, protection device 56 may be connected to one or both of implement 18 and/or cab structure 20. In alternate embodiments, protection device 56 may have curved surfaces and/or multiple surfaces available to protect cab structure 20 from frame 12 and/or implement 18.

In one embodiment, both cab structure 20 pivots or rotates toward front end 24. However, one having ordinary skill in the art can appreciate that cab structure 20 may be configured to pivot or rotate in other directions. In other words, cab structure 20 may be configured to pivot or rotate in directions other than toward front end 24, such as toward an opposite end 22 (FIG. 2), or toward sides 26, 27.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A work vehicle comprising:
   a frame;
   a cab structure has a pivotal connection with the frame, the cab structure having at least front and rear walls to surround and protect the operator;
   an implement connected to the frame, wherein the cab structure is forwardly pivotable, with respect to the frame, towards the implement; and
   a protective device disposed between the cab structure and the implement to substantially limit pivotal movement of the cab structure with respect to the implement to prevent contact between the cab structure and the implement, wherein the protection device has side walls with front and rear surfaces extending therebetween, the rear surface of the protection device coupled to a lower portion of the front wall of the cab structure adjacent to a the pivotal connection between the cab structure and the frame, further wherein the front surface of the protection device contacts the implement when the cab structure is pivotally rotated about the frame.

2. The work vehicle of claim 1, wherein the body is removably connected to the cab structure.

3. The work vehicle of claim 1, wherein the body is removably connected to the implement.

4. The work vehicle of claim 1, wherein the body is manually removable from the implement.

5. The work vehicle of claim 1, wherein the body is composed of a substantially rigid material.

6. The work vehicle of claim 1, wherein the body is composed of a substantially non-marring material.

7. The work vehicle of claim 1, wherein the cab structure includes a door.

8. The work vehicle of claim 7, wherein the door is pivotably connected to the cab structure.

9. The work vehicle of claim 7, wherein the body is connected to the door.

10. The work vehicle of claim 9, wherein the connection between the body and the door is a tethered connection.

11. The work vehicle of claim 10, wherein the body is connected to the cab structure.

12. The work vehicle of claim 11, wherein the body is manually removable from the cab structure.

13. A method for limiting rotational movement comprising:
    disposing a protection device between a cab structure and an implement of a work vehicle, the cab structure having at least front and rear walls to surround and protect the operator, the cab structure having a pivotal connection with a frame of the work vehicle, and the implement pivotably connected to the frame, wherein the cab structure is forwardly pivotably, with respect to the frame, towards the implement; wherein the protection device substantially limits pivotal movement of the cab structure with respect to the implement to prevent contact between the cab structure and the implement, wherein the protection device has side walls with front and rear surfaces extending therebetween, the rear surface of the protection device coupled to a lower portion of the front wall of the cab structure adjacent to the pivotal connection between the cab structure and the frame, further wherein the front surface of the protection device contacts the implement when the cab structure is pivotally rotated about the frame.

14. The device of claim 13, wherein the step of disposing the body includes removably connecting the body to the cab structure.

15. A work vehicle comprising:
    a frame;
    a cab structure having at least front and rear walls to surround and protect the operator, the cab structure has a pivotal connection with the frame;
    an implement connected to the frame, wherein the cab structure is forwardly pivotable with respect to the frame, towards the implement; and
    a protection device disposed between the cab structure and the implement to substantially limit pivotal movement of the cab structure with respect to the implement to prevent contact between the cab structure and the implement, wherein the protection device has side walls with front and rear surfaces extending therebetween, the rear surface of the protection device coupled to a lower portion of the front wall of the cab structure adjacent to the pivotal connection between the cab structure and the frame, further wherein the front surface of the protection device contacts the implement when the cab structure is pivotally rotated about the frame.

16. The work vehicle of claim 15, wherein the body is removably connected to the cab structure.

17. The work vehicle of claim 15, wherein the body is removably connected to the implement.

18. The work vehicle of claim 15, wherein the body is manually removable from the cab structure.

19. The work vehicle of claim 15, wherein the body is removably connected to the door.

\* \* \* \* \*